United States Patent [19]

Olson et al.

[11] 4,070,424
[45] Jan. 24, 1978

[54] METHOD AND APPARATUS FOR CONDITIONING FLUE GAS WITH A MIST OF $H_2SO_4$

[75] Inventors: Wallace I. Olson, Darien; Robert H. Gaunt, Ridgefield; Jerome G. Lynch, Bridgeport, all of Conn.

[73] Assignee: UOP Inc., Des Plaines, Ill.

[21] Appl. No.: 725,058

[22] Filed: Sept. 21, 1976

[51] Int. Cl.² .......................................... F02M 15/04
[52] U.S. Cl. ...................................... 261/142; 55/5; 55/10; 55/15; 55/122; 239/124; 239/127; 239/135; 239/426; 239/591; 261/36 R; 261/78 A; 261/DIG. 48; 261/116; 423/522
[58] Field of Search ................... 239/8, 102, 124, 127, 239/135, 426, 431, 591; 55/5, 15, 107, 10, 122; 261/116, DIG. 48, 142, 36 R, 78 A; 137/563, 551; 423/522

[56] References Cited

U.S. PATENT DOCUMENTS

| | | | |
|---|---|---|---|
| 2,010,926 | 8/1925 | Osterman | 137/551 |
| 2,591,157 | 4/1952 | Hutchinson | 239/8 |
| 2,602,734 | 7/1952 | Hedberg et al. | 55/10 |
| 2,722,456 | 11/1955 | Glessner | 239/127 |
| 3,034,771 | 5/1962 | Harris | 261/116 |
| 3,061,198 | 10/1962 | Kerr et al. | 239/124 |
| 3,240,254 | 3/1966 | Hughes | 239/102 |
| 3,363,398 | 1/1968 | Wheatoroff et al. | 55/5 |
| 3,665,576 | 5/1972 | McKewen | 55/5 |
| 3,686,825 | 8/1972 | Busby | 55/5 |
| 3,763,634 | 10/1973 | Allisen | 55/277 |

FOREIGN PATENT DOCUMENTS 133,099 4/1933 Austria .................................. 239/135

*Primary Examiner*—Bernard Nozick
*Attorney, Agent, or Firm*—James R. Hoatson, Jr.; Barry L. Clark; William H. Page, II

[57] ABSTRACT

In order to reduce the electrical resistance of entrained fine particles of fly ash resulting from the burning of low sulfur coal and to enhance the efficiency of their collection by an electrical precipitator means, there is a conditioning of the particles carried in the flue gas stream by having a very fine mist of $H_2SO_4$ condensed and adsorbed on the particles themselves. Sulfuric acid is mixed with air in an acoustic nozzle to form a mist having a mean particle size of less than 10 microns which is injected uniformly into the flue gas stream at a zone ahead of the precipitator unit so that the acid can condense on the particles. The acid is preferably transported through the apparatus at ambient temperature and then heated just prior to injection to a temperature less than its vaporization temperature.

15 Claims, 6 Drawing Figures

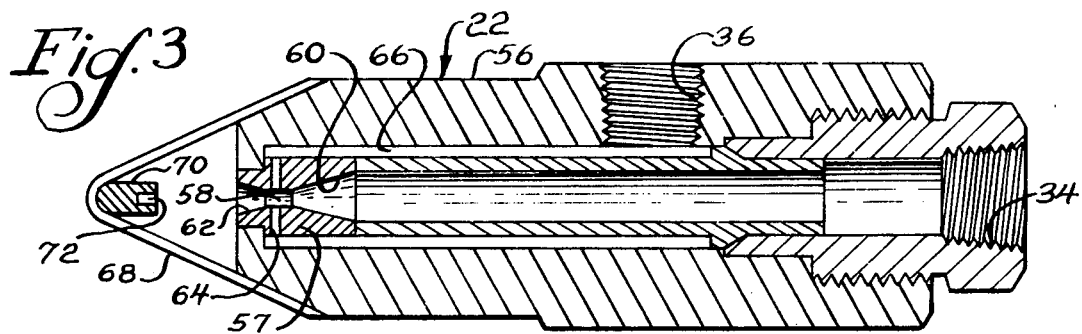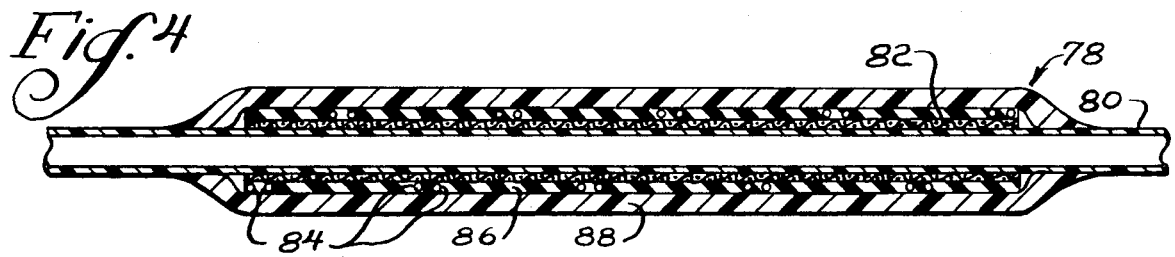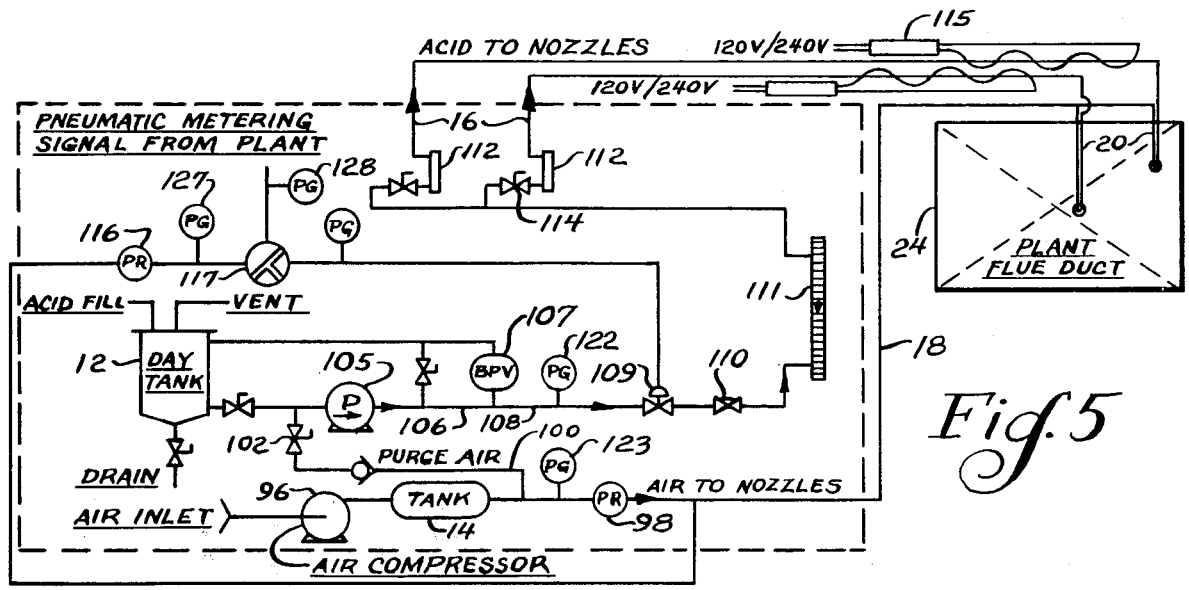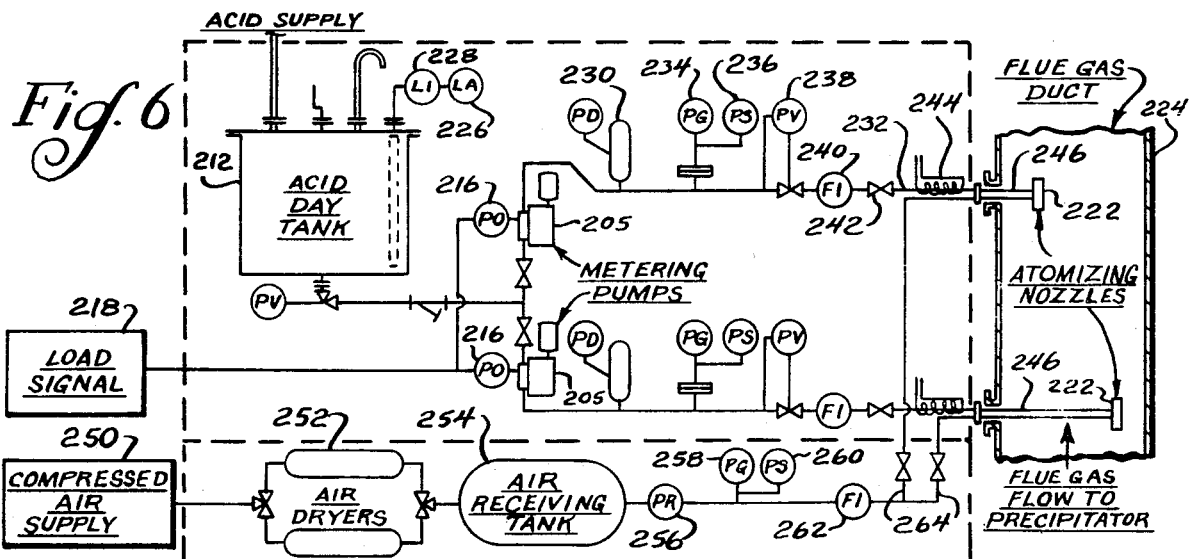

METHOD AND APPARATUS FOR CONDITIONING FLUE GAS WITH A MIST OF $H_2SO_4$

BACKGROUND OF THE INVENTION

This invention relates to a conditioning system for preparing and introducing sulfuric acid ($H_2SO_4$) into a particle laden flue gas stream so as to substantially reduce the resistivity of the fine fly ash particulates to in turn enhance their removal from the gas stream by electrical precipitator means.

It has been found, and is quite well known, that fly ash containing streams from the burning of coal, or from the burning of any fossil fuels, will have a certain amount of electrical resistance or "resistivity" developed in the particles such that an inefficient electrical precipitation thereby results. It is also well known that flue gas streams will have varying quantities of sulfur trioxide ($SO_3$) present naturally and that when a sufficient quantity of $SO_3$ or $H_2SO_4$ is present in the gas stream or with the fly ash the resistivity of the particles to giving up their electrostatic charges will be low enough that good precipitation results can be obtained.

With ever increasing state and federal pressure on industrial and utility companies to improve their emissions from coal fired boilers and comply emission standards, many have switched to the use of low sulfur coal to reduce the amount of $SO_2$ present in the flue gases. Unfortunately, while the flue gas from high sulfur coal contains sufficient $SO_3$ to provide the proper resistivity, low sulfur coal lacks sufficient $SO_3$ in the flue gas to provide the proper resistivity to the resulting fly ash to permit its effective precipitation. Thus, these users are more than ever seeking immediate and low cost solutions to poor fly ash collection efficiencies of their existing electrostatic precipitators. Their possible options are to expand or rebuild their existing equipment to handle the type of flue being fired or by going to gas conditioning of the boiler combustion gases. Gas conditioning is used to bring the exhaust fly ash within a more desirable resistivity range for precipitator collection. Gas conditioning is economically more attractive to industry due to its relatively low purchase price when compared to the purchase price of an enlarged or new precipitator. Availability is a second advantage to this approach in that the system can be installed fairly quickly and with minimal load disturbance.

Various methods of gas conditioning are presently available. The more effective conditioning agents are $H_2SO_4$ and $NH_3$. A system which is presently marketed and which is described in U.S. Pat. No. 3,704,569 uses vaporized $H_2SO_4$ as its conditioning agent. With this system, large volumes of dry air are heated to a temperature of approximately 260° C. to be above the vaporizing temperature of about 235° C. and then mixed with the acid in a glass lined vaporizing chamber. The hot vaporized acid is then conveyed to injection lances by means of glass lined pipe and uniformly dispersed in the flue gas. Although such a system provides excellent conditioning of the flue gases, it is quite expensive to produce due to the fact that the acid is transported in a hot vaporized state and is extremely corrosive, with the result that expensive, corrosion-resistant materials are required to be used. Furthermore, the system is expensive to operate since an excessive amount of energy must be used to heat the air to a point where it can vaporize the acid.

A second method of gas conditioning is that of utilizing $SO_3$ directly. This system functions much the same as the aforementioned vaporizer except that heat is applied to the liquid $SO_3$ in an evaporator chamber resulting in the $SO_3$ vapor.

A third method is disclosed in U.S. Pat. No. 1,441,713 where acid is proposed to be introduced in a gas stream in the form of very fine particles and specifically, in the form of a fume which is formed by boiling fuming sulfuric acid. Although the patentee broadly contemplates that the acid be introduced by some suitable form of atomizing device, no apparatus is disclosed other than the boiling pan and burners. In view of the extremely corrosive and dangerous nature of fuming sulfuric acid, it is doubtful that the aforesaid method would have ever been used. Certainly if it was it would have been expensive to provide corrosion-resistant materials and to provide the necessary heat for boiling the acid.

A fourth and more complex method of gas conditioning is that of burning liquid sulfur. The $SO_2$ generated by the sulfur burner is passed through a catalyst that converts the $SO_2$ to $SO_3$. The final objective of all four methods is to disperse $H_2SO_4$ in the precipitator flue gases and condition same to a more desirable resistivity for precipitator collection. The dispersion must be very fine since an electrical precipitator is an effective collector of sulfuric acid mist. As noted above, conditioning usually involves the injection of $H_2SO_4$ or $SO_3$ in the flue gas stream in vaporized form, and the injection of acid in liquid form apparently has not been done commercially, probably for the reason that one would expect that liquid injection would not condition beyond the first field of a precipitator since the acid particles would be collected, leaving the remaining fields current suppressed due to the presence of unconditioned fly ash accumulated on the electrodes. Furthermore, until the rather recent development of sonic nozzles, the available mechanically atomized spray nozzles were not able to produce a fine enough spray to be considered as a substitute for vapor injection. Mechanical nozzles typically are poor in their ability to be turned down to low flows. Also, the required high liquid pressures and small orifices used would increase the likelihood of erosion and plugging problems.

SUMMARY OF THE INVENTION

It can be readily appreciated that although all of the aforementioned prior art systems for gas conditioning by injection of $SO_3$ or $H_2SO_4$ provide satisfactory results, they achieve these results at considerable expense in terms of capital equipment requirements and in terms of the excessive amounts of energy which they utilize. Obviously, it would be desirable to have a system which can be produced and operated at a lower cost and it is among the objects of the present invention to provide such a system.

By the apparatus and method of the present invention it is possible to achieve $H_2SO_4$ gas conditioning performance levels equivalent to the prior art levels of vaporizing systems, but at much lower costs in terms of equipment requirements and in terms of day to day operating expense requirements, particularly for energy. Basically, the conditioning process consists of pumping a metered volume of warm 93–98% $H_2SO_4$ through an atomizing nozzle directly into the flue gas stream, creating a very fine $H_2SO_4$ mist having a mean particle size of no more than about 10 microns. Acoustic standing wave energy set up by an atomizing air supply at the nozzle tip provides the energy necessary to dissociate the larger H₂SO₄ molecules into smaller droplets. The system has the distinct advantage of minimizing equipment and conveying line corrosion in that the $H_2SO_4$ is not conveyed to the injection lances in a vaporized form. $H_2SO_4$ is in its most corrosive state under vaporized conditions. Conveying the acid in liquid form to the lances enables the equipment to be constructed of more available and inexpensive materials. Only the lances, the nozzles and the section of heated line adjacent the lances must be constructed of corrosion-resistive material capable of resisting the high temperature environment in the flue and the atomizing aeration of the acid at the nozzle. Since the air entering the lances is not heated, and the acid is only warmed in a short section of line adjacent the lance to reduce its viscosity, the operating cost as well as construction cost will be substantially less than other conventional gas conditioning systems.

In operation in a pilot plant unit at ambient temperature, acid from a day storage tank is filtered prior to entering the system acid pump. Depending upon a system feed control signal, a volume of $H_2SO_4$ corresponding with the desired injection rate is delivered to the nozzles. From the metering equipment the acid then passes through a set of trim valves and rotameters. This equipment enables the operator to bias the flow slightly between injection lances and monitor the flow to each. Pressure gauges are provided to insure proper liquid and air pressure to the nozzles. Prior to passing through the lance nozzles, electrically heat traced conveying lines heated to a temperature of about 120°–137° C. warm the acid to a temperature of between about 93°–121° C. prior to injection. The advantage of running warmed acid to the nozzles is to reduce the viscosity and surface tension of the individual acid droplets, thus enabling the acoustic shock wave to more effectively shatter the acid droplets. The warmed acid is then passed through the nozzles where it mixes with the dry atomizing air and is converted to a fine acid mist with mean droplet sizes of not more than about 10 microns, and preferably from 1–3 microns. A controlled air pressure of at least about 10 psig higher than the acid pressure is maintained to the nozzles to insure proper atomizing energy. Liquid and air pressure gauges are installed at the lances to insure the proper ratio.

A chemical feedback signal downstream of injection may be used to determine the $H_2SO_4$ content of the flue gas and signal the metering equipment to maintain the desired concentration. For example, a Land Dewpoint meter would be suitable for this purpose. The maximum injection concentration will be limited to the dew point temperature of the flue gas and will be controlled at a safe margin from dew point. Alternatively, and especially where the coal used in a boiler has a uniform $SO_3$ content, the injection rate of acid can be controlled in response to changes in the plant load to provide 15–30 ppm acid in the flue gas.

Tests of the acid mist injection system of the present invention have indicated that substantial improvement in precipitator performance can be realized using the above system.

BRIEF DESCRIPTION OF THE DRAWINGS

FIG. 3 is an axial cross-section of an atomizing injection nozzle;

FIG. 4 is an axial cross-section of a heater hose;

FIG. 5 is a schematic flow diagram of the "pilot plant" type of gas conditioning apparatus shown in FIG. 1; and FIG. 6 is a schematic flow diagram of an alternative "commercial" type of gas conditioning apparatus.

DESCRIPTION OF THE PREFERRED EMBODIMENT

Figure 1:
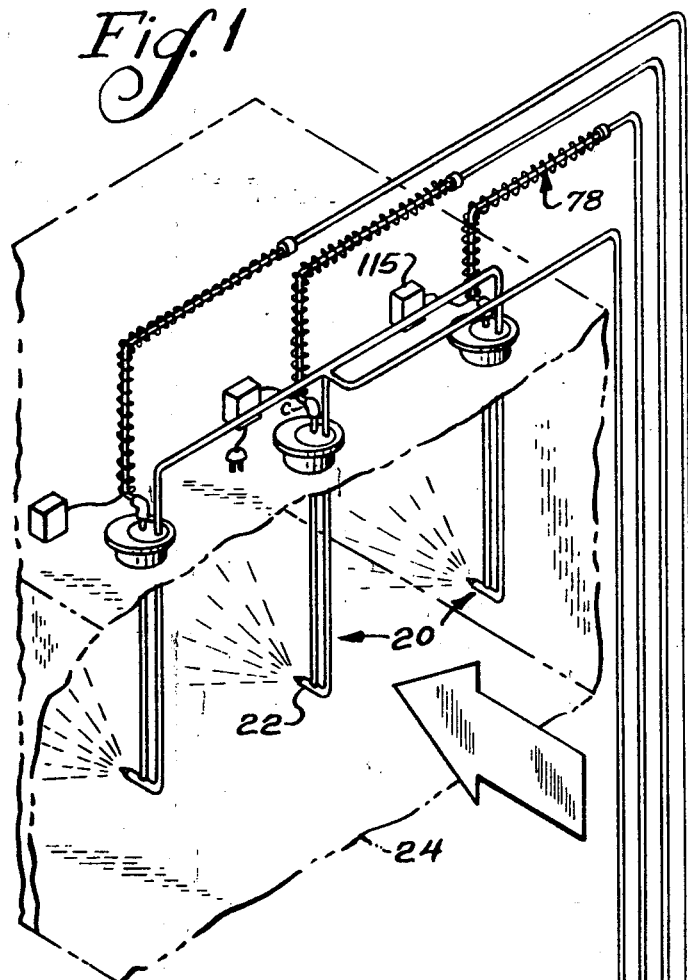
FIG. 1 is an isometric view of a skid showing the various structural elements of the gas conditioning system which are connected to injection lances in a precipitator inlet duct.

Referring to FIG. 1, the improved gas conditioning apparatus shown generally at 10 includes an acid day tank 12 and an air tank 14. Acid lines 16 and an air line 18 are connected to a plurality of lance assemblies indicated generally at 20 which have acid mist injection nozzles 22 at their outer ends. The lance assemblies 20 are adapted to pass through the top or side of a duct member 24 at a position in a flue gas stream which is upstream from an electrostatic precipitator (not shown). The particular position upstream should be such that the acid mist will be uniformly dispersed by the time it reaches the precipitator and the number and position of the lances should be selected to provide uniform dispersion.

The embodiment of FIG. 1 shows a "pilot plant" unit wherein the major portion of the gas conditioning apparatus is mounted on skid member 26 which may be conveniently located near an existing electrostatic precipitator (not shown). Mounted on the skid 26 is a control panel 28 which encloses various structural elements to be described hereinafter.

Figure 2:
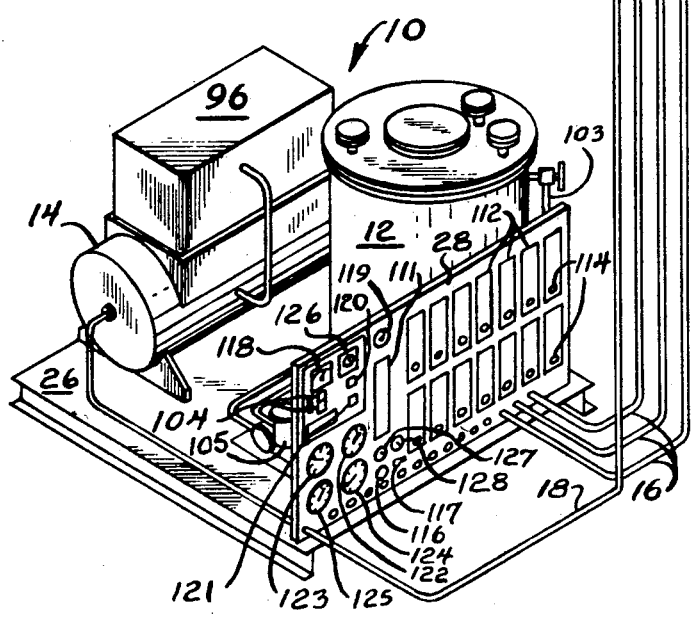
FIG. 2 is an axial cross-section of an injection lance.
Figure 2:
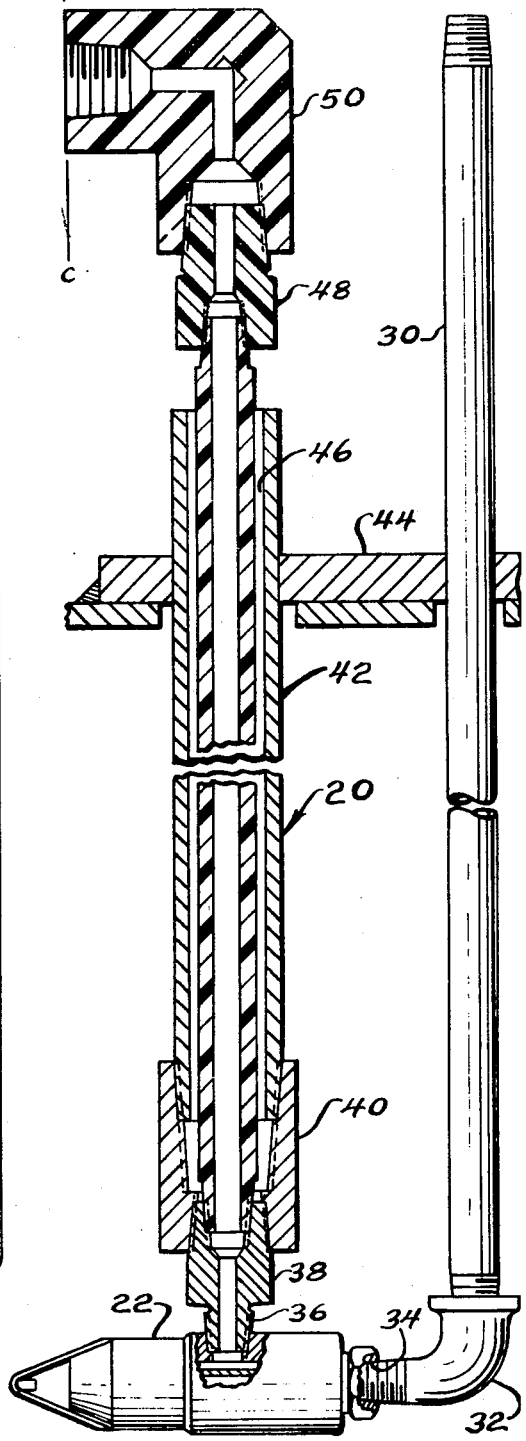

Referring to FIG. 2, one of the lance assemblies 20 is shown partially in cross-section. The lance assembly includes an air supply pipe 30 and a street ell fitting 32 which may be made of a corrosion-resistant material such as Carpenter 20 steel capable of withstanding the flue gas environment. The fitting 32 is adapted to be threaded into an opening 34 in the end of a nozzle 22, preferably made of tantalum, for supplying air to the nozzle. Similarly, an opening 36 in the side of the nozzle is adapted to receive an adapter member 38 which is also preferably made of tantalum. The adapter 38 is connected to a coupling member 40 of Carpenter 20 steel which is in turn attached to a pipe member 42 of Carpenter 20 steel for supporting the lance 20 within a sleeve member 44 which is attached, such as by welding, to the wall of a duct member 24. An inner tube 46 made of a corrosion-resistant material such as polytetrafluoroethylene (hereinafter PFE) is attached at its lower end to the corrosion-resistant tantalum adapter 38 and at its upper end to an adapter 48 formed of PFE which is threaded into a PFE elbow member 50.

The nozzle member 22 is shown in detail in FIG. 3. The nozzle includes a main body portion 56 preferably formed of tantalum and having positioned within it an orifice member 57 containing an orifice 58 and including an inlet cone portion 60 and an outlet cone portion 62. The orifice 58 acts as a venturi to increase the velocity of the air and to assist in drawing liquid acid through two pairs of opposed holes 64 which communicate with the annular acid-containing reservoir 66 positioned between the orifice member 57 and the body 56 and the acid inlet opening 36. Positioned at the outer end of the nozzle 22 are a pair of support arms 68 which carry and support a resonator cup member 70 having a cavity 72. The nozzle 22 produces an intense field of sonic energy which breaks the acid particles up into an extremely fine mist having a mean particle size no greater than 10 microns and preferably 1-3 microns. The model is preferably made in a shape similar to the Model 052 nozzle sold by Sonic Development Corporation of Upper Saddle River, N.J. The theory of operation of such nozzles is generally explained in U.S. Pat. No. 3,240,254, which patent is incorporated by reference herein. To resist corrosion, the nozzle 22 must be made of tantalum or other material capable of withstanding the corrosive environment produced by the warmed liquid acid within the nozzle and the hot acid mist which can contact the exterior portions of the nozzle. Materials such as stainless steel and Hastelloy normally offered by the nozzle manufacturer for corrosion resistance are of little use in a warm acid environment since they would corrode very quickly.

FIG. 4 shows an enlarged cross-section of a portion of the heater assembly indicated generally at 78 in FIG. 1. The heater assembly includes a PFE core tube portion 80 which is preferably threadably attached at one end to PFE elbow member 50 (FIG. 2) and at its other end to one of the acid supply lines 16 which would normally be made of either stainless steel tubing or PFE tubing with a protective steel braid over it. The PFE core tube 80 in the heater assembly 78 is shown as being covered by a stainless steel braid 82 which is in turn covered by resistance heating wires 84 embedded in flexible insulating material 86. The outside layer of the heater assembly 78 comprises a tough resilient jacket member 88. The aforementioned heater assembly construction provides a member which is quite bendable and thus facilitates the connection of the acid lines 16 which are attached to the apparatus mounted on the skid 26 and the lances 20 which are mounted in the duct 24. The heater wires 84 are, of course, attached to a suitable source of electric power, preferably through temperature controllers 126. The purpose of the heater hose 78 is to add heat to the acid to lower its viscosity before it enters the lance 20 and nozzle 22.

Although the "pilot plant" skid mounted structure shown in FIG. 1 provides a completely self-contained means (except for power) to quickly and simply mount a gas conditioning apparatus 10 to a duct 24 leading to a precipitator, it would probably be preferable in most cases to mount the various elements of the apparatus in a more permanent fashion. The principal use of the skid mounted apparatus is as a "pilot" unit to quickly demonstrate the usefulness of the system in various flue gas environments and determine the optimum injection rate therefor. The schematic flow diagram illustrated in FIG. 5 relates to the skid mounted unit shown in FIG. 1. The system is designed to be very flexible in that an extremely large range of flow rates of acid, from about ¼ to about 25 gallons per hour, can be provided from a single pump. This very large range of adjustment, a turn down ratio of 50:1, permits the unit to supply from 1 to 14 nozzles, but provides some penalty in that it is somewhat difficult to maintain an accurate flow to each nozzle without actively monitoring and adjusting the controls. Where a "commercial" unit is designed to be used in a specific plant, the degree of turn down would not have to be over about 10:1, corresponding to a flow rate of perhaps 2.5 to 25 gallons per hour. As compared to the 50:1 turn down ratio of the aforementioned "pilot" system, a "commercial" system with a lower turn down ratio and individual metering pumps for each 1 or 2 nozzles could operate unattended for extended periods with no adjustments.

Referring to the flow diagram of FIG. 5 which corresponds to the pilot plant system shown in FIG. 1, the compressor 96 takes incoming air and compresses it into the air tank 14 where its pressure is maintained between a predetermined set of values. The air is fed to the nozzles 22 through a common line 18 and has its pressure maintained at a constant value, such as 70 psig, by a pressure regulator 98. For purging acid from the system when shutting down the unit, a side pipe 100 having a valve 102 is provided between the air line and acid line.

The acid system includes a day tank 12 having a sight gauge 103 (FIG. 1) and high and low level alarm systems connected to indicators 104 and a horn (not shown). A gear type pump 105 is connected to the outlet of tank 12. The pump 105 produces a variable amount of flow depending upon the resistance downstream. The pipe line 106 downstream of the pump 105 incorporates a backpressure valve 107 which lets part or all of the acid being pumped circulate to the day tank 12. This valve 107 maintains a set backpressure of 30 psi, for example. The line 108 to the nozzles 22 is taken off line 106 between the pump and the backpressure valve. Thus, line 108 always sees the same upstream pressure (the set point of the back-pressure valve) and for a given line resistance, will have a set flow through it. This line resistance is set by an air operated valve 109. The acid then flows through a shut-off solenoid valve 110 which closes the acid line if any abnormal condition should develop such as a loss in air pressure or a drop in the duct temperature. The flow is measured by a main rotameter 111 that reads total acid flow to the nozzles 22 and by smaller auxiliary rotameters 112 in the individual lines 16 which communicate with each nozzle. The smaller rotameters 112 have trim valves 114 which may be used to fine adjust the acid flow to the individual nozzles.

The metered amount of acid flows through individual acid lines 16 to the lances 20. These lines preferably comprise small diameter stainless steel pipe, tubing or armored PFE hose. Just before entering the lances 20 which hold the nozzles 22 in the duct 24, the acid is heated in a short (25 feet is satisfactory) section 78 of electrically heated PFE tubing 80 whose temperature is controlled by a controller 115. The warmed acid atomizes more easily into very small particles than cool acid. Finally, the acid flows to the lance pipes 46 into the nozzles 22 and is atomized in a fine spray which is dispersed in the flue gas.

The air operated valve 109 provides the acid flow control. The position of the valve controls the flow by varying the resistance to flow in the acid line. The position can be adjusted manually by sending the valve a signal (air pressure) from pressure regulator 116 set at the desired value between about 6-30 psig on the control panel 28. When selector valve 117 is put on "automatic" control, a signal from the plant is sent to the valve. This signal should be proportional to the amount of flue gas being produced. The acid flow rate will then be proportional to the amount of flue gas being produced by the plant. It should be noted that a number of other independent variables affect acid flow in the aforementioned system. If the viscosity of the acid varies (as it does with temperature changes), the flow will vary. Also, any small particles partially blocking nozzles or valves will vary the flow.

To provide the operator with as much information as possible, the control panel 28 also includes a tank liquid level indicator 118, a tank temperature indicator 119, a system "on" indicator 120, a power "on" indicator 121, pressure gauges 122–125 for inlet fluid, inlet air, outlet fluid and outlet air, respectively. Gauge 126 is a temperature set point gauge for setting the lowest temperature of the flue gases at which the system will operate. This keeps the system from operating below the dew point of the acid. Gauges 127, 128 indicate the manual and automatic control pressure, respectively, of the air acting on control valve 109 in response to actuation of pressure regulator 116 and selector valve 117. Although only two rotameters 112 and two lances 20 are shown in the diagram of FIG. 5 for simplicity, it would be common to have six to 14 of each to achieve uniform acid dispersion in a large duct.

FIG. 6 illustrates a schematic flow diagram of a gas conditioning system incorporating the invention which might be typically used in a commercial situation. The principal distinction between a so-called "commercial" unit and the "pilot plant" unit shown in FIGS. 1 and 5 are that the pilot plant unit uses a single gear driven pump 105 to feed acid to anywhere from one to 14 nozzles, depending on the size and capacity of the flue duct 24. The "commercial" system illustrated in FIG. 6 utilizes a plurality of metering pumps 205 which are positive displacement pumps. The number of pumps used depends on the total flow required with a different pump being used for each single lance or a pair of lances. The pumps pull in a given quantity of acid from the day tank 212 on the suction stroke and force it through the outlet on the pressure stroke. The quantity of acid delivered to and by each pump is determined by pneumatic output valves 216 which are operated by the load signal 218 in response to a parameter such as the volume of flue gases or the amount of $SO_3$ in the flue gases downstream of the precipitator. Thus, the downstream piping resistance to flow does not materially effect the flow output of the metering pumps. This is in contrast to the gear type pump 105 used in the "pilot" unit wherein the flow varies depending on the downstream resistance. The metering pumps 205 distribute the flow uniformly to a plurality of nozzles 222 arranged in duct 224 without any need for trim valves.

Referring to FIG. 6 in more detail, the acid day tank 212 includes high and low level alarms 226 and a level indicator 228. The acid is piped from the day tank 212 to the metering pump or pumps 205. As previously mentioned, the number of pumps 205 depends on the total flow required. The acid is piped from the pumps 205 through a pulsation dampener 230 which serves to smooth out the flow due to the piston strokes of the pump. The line 232 between the pulsation dampener 230 and the nozzles 222 includes a pressure gauge 234 for measuring the pressure, a pressure switch 236 which serves as an alarm for abnormal pressure conditions, a backpressure valve 238 which produces the pressure needed for the pump check valves (not shown) to close tightly, a flow indicator 240 to indicate that the pump is actually pumping and a shut-off valve 242 to close off the acid line. The acid line 232 would also include a heated section of tubing 244 and lances 246 which would be constructed similarly to the identical elements in the pilot system of FIGS. 1 through 5. The air is shown as coming from a compressed air supply 250 rather than a separate air compressor since a plant commonly has a source of compressed air. Air dryers 252 are provided for cleaning and drying the incoming air before it passes to an air receiving tank 254 which holds a supply for limited times when the supply 250 may fail. After the air leaves tank 254 it passes through a pressure regulator 256, a pressure gauge 258, a pressure switch 260, and a flow indicator 262 before passing through lines 264 which are connected to the lances 246.

The optimum acid injection rate for the gas conditioning apparatus is the one that produces the best results in fly ash collection without acid carrying over past the precipitator. This rate is generally between 15–30 ppm acid to flue gas. The exact ratio will vary, however, with the flue gas rate, the coal analysis, plant operation, precipitator condition, and other variables.

One method of determining and controlling the acid injection rate is as follows. For a given coal the plant is operated at full rate and the acid injection through nozzles 22 (FIG. 1) is increased to the point of maximum precipitator collection efficiency as determined by observing the stack, observing the precipitator electrical performance parameters and/or taking flue gas samples. After the correct rate for the plant at full load is known, a signal provided to the conditioning unit by the plant which is roughly proportional to the flue gas flow rate should provide automatic injection of the correct amount of acid. This signal is transmitted to air control valve 109 (FIG. 5) and permits the acid injection rate to drop proportionally to any drop in the flue gas flow rate. Thus, the amount of acid being injected can be kept in constant proportion to the flue gas. If a plant is operated near full load most of the time and uses a single type of coal the aforementioned control system is very dependable. If the plant burns several types of coals with different optimum acid injection rates for the different ones, a more sophisticated control system, such as one dependent on the $SO_3$ content of the flue gas entering the precipitator can be used.

It is important that acid not be permitted to condense on the duct or precipitator surfaces since condensation is highly corrosive. Accordingly, a temperature set gauge 126 is provided to shut off the injection of acid if the flue gas temperature should get so low that the dew point of the acid might be reached. Although dew points typically range from 120° to 140° C. the set point is generally set at 140°–150° C. to provide a safety factor. The typical flue gas temperature would be 165° to 220° C.

It is difficult to predetermine the exact air pressure and acid pressure which will provide the best results in one of the nozzles 22 since it is virtually impossible to make two nozzles which will perform identically. However, it has been determined that satisfactory operation can be obtained if the air pressure value is at least about 10 psig above the fluid value. If the air pressure value is too high the spray pattern will be very wide and in high velocity installations may angle back sufficiently about the nozzle to form droplets, defeating the purpose of the nozzle. If the air pressure is too high, it is also possible to cut off the flow of acid from the nozzle. If the air pressure is too low, no atomization will occur and the acid will dribble from the nozzle. In one nozzle that provided excellent results, the orifice opening 58 had a diameter of 0.053 inches while the holes 64 through which the acid passes had a diameter of 0.029 inches. Although there are pressure drops in the system which vary with the length of the lines 16, 18, a typical operating pressure for a nozzle might be 2.5 gph flow and 4 psig pressure for the acid and 2.5 scfm flow and 38 psig pressure for the air. These pressures would be measured at the flange location 44 where the lance penetrates the ductwork.

We claim as our invention:

1. Method of injecting an acid conditioning agent into a flue gas stream containing fly ash to be conditioned to enhance the efficiency with which the fly ash can be electrostatically precipitated comprising the steps of:
    passing sulfuric acid conditioning agent under pressure through a first line into a lance incorporating a sonic atomizing nozzle;
    heating a portion of said first line adjacent said lance so that said acid will be heated to a temperature higher than ambient but lower than its vaporizing temperature and which is sufficient to increase its temperature to at least about 93° C. before it leaves the nozzle; and
    passing a gas under pressure through a second line into said nozzle, said gas pressure being at least about 10 psig higher than the liquid acid pressure, and said nozzle incorporating means to produce sonic vibrations capable of breaking up said liquid acid into a mist having a means droplet size no greater than about 10 microns.

2. The method of claim 1 wherein said nozzle breaks up said liquid acid into a mist having a mean droplet size no greater than about 5 microns.

3. The method of claim 1 wherein said conditioning agent comprises $H_2SO_4$ injected at a rate of 15–30 ppm acid to flue gas.

4. The method of claim 3 wherein the volume of acid injected is automatically varied with changes in the flow rate for the flue gas stream.

5. An apparatus for injecting a mist of liquid sulfuric acid having a mean particle size of less than about 10 microns into a flue gas stream to condition fly ash in the stream and enhance the efficiency with which the fly ash can be electrostatically precipitated downstream of the apparatus comprising: a flue gas duct; a source of liquid sulfuric acid; a source of compressed air; at least one sonic nozzle mounted on a lance positioned in the flue gas stream duct; a pump for delivering acid from said acid source to said lance and nozzle under pressure; said nozzle and lance being connected to said sources of acid and air by flow lines, the flow line for the acid having heating elements surrounding it for a portion of its length immediately adjacent said lance so as to raise the temperature of the acid leaving the nozzle to at least 93° C. but to a value less than the vaporization temperature.

6. The apparatus of claim 5 wherein the source of acid is a day tank and the source of air is a compressor, said day tank and compressor being mounted on a portable skid along with said pump.

7. The apparatus of claim 5 wherein said nozzle includes an axially positioned venturi shaped orifice through which air is directed in an axial direction and a plurality of radial openings extending outwardly from said orifice to an acid-containing chamber for delivering acid to said orifice where it is entrained in said air and carried outwardly where it impinges into the sonic energy field and is dissociated.

8. The apparatus of claim 5 wherein the pressure of the air delivered to the nozzle is at least 10 psig higher than the pressure of the acid delivered to the nozzle.

9. The apparatus of claim 5 wherein the acid is continually pumped so that a portion recirculates to the source through a backpressure valve and a portion is delivered to said at least one nozzle, the pressure on the portion delivered to said at least one nozzle being controlled by a flow control valve.

10. The apparatus of claim 9 wherein said flow control valve is operated automatically by a signal which varies with the volume of flue gases.

11. The apparatus of claim 9 wherein a plurality of nozzles are provided and a main rotameter is positioned downstream of said flow control valve to control the total flow to said plurality of nozzles, auxiliary rotameters being provided downstream of said main rotameter for permitting the flow to each individual nozzle to be controlled.

12. The apparatus of claim 5 wherein said pump is a positive displacement metering pump.

13. The apparatus of claim 12 wherein a plurality of nozzles and a plurality of positive displacement metering pumps are provided.

14. The apparatus of claim 5 wherein said nozzle is made of tantalum in at least the portions thereof which are contacted by heated acid.

15. The apparatus of claim 14 wherein the lance and the portions of the flow lines which carry heated acid are lined with polytetrafluoroethylene.

* * * * *